US005533255A

United States Patent [19]

Perugini et al.

[11] Patent Number: 5,533,255

[45] Date of Patent: Jul. 9, 1996

[54] TOOL FOR ON-SITE REPAIRING AND/OR REPLACING OF ELECTRICAL CONNECTORS

[75] Inventors: Michael N. Perugini, Monroe; Thomas I. Crilly, III, Watertown, both of Conn.

[73] Assignee: Burndy Corporation, Norwalk, Conn.

[21] Appl. No.: 361,235

[22] Filed: Dec. 21, 1994

[51] Int. Cl.[6] .............................. B23P 19/04; H01R 43/00

[52] U.S. Cl. .............................. 29/758; 29/278; 29/747; 29/759; 29/764

[58] Field of Search .............................. 29/267, 278, 747, 29/758, 759, 764, 426.6

[56] References Cited

U.S. PATENT DOCUMENTS

| | | | |
|---|---|---|---|
| 3,181,906 | 5/1965 | De Rose et al. | 29/278 X |
| 3,484,129 | 12/1969 | Askren | 29/764 X |
| 4,223,934 | 9/1980 | Cauceglia et al. | 29/764 X |
| 4,411,064 | 10/1983 | Koppensteiner et al. | 29/267 X |
| 4,597,173 | 7/1986 | Chino et al. | 29/764 X |
| 4,817,274 | 4/1989 | Higgins | 29/764 |
| 5,210,093 | 5/1993 | Lenzi et al. | 29/747 X |

FOREIGN PATENT DOCUMENTS

| | | | |
|---|---|---|---|
| 2337013 | 7/1977 | France | 29/764 |
| 1228175 | 4/1986 | U.S.S.R. | 29/764 |

OTHER PUBLICATIONS

Kehley et al. "Retainer and Extractor Card Holder for Printed Circuit Cards" IBM Technical Disclosure Bulletin, vol. 24, No. 4, Sep. 1981, pp. 2121–2122.

*Primary Examiner*—Peter Vo
*Attorney, Agent, or Firm*—Perman & Green

[57] ABSTRACT

The tool has a frame and a positioner. The frame has top and bottom guide rails that are suitably sized and located to be slidingly received in guide channels of a printed circuit board receiving cage. A locking latch is provided on the frame to stationarily, but removably latch the frame to the receiving cage. The positioner is movably attached to the frame and has a working head receiving area. The working head receiving area is adapted to removably mount any one of a plurality of working heads to the positioner. The positioner is adapted to move an attached working head to a desired location for inserting and/or removing an electrical contact in an electrical connector of the cage, or inserting and/or removing an electrical connector in the cage.

13 Claims, 3 Drawing Sheets

TOOL FOR ON-SITE REPAIRING AND/OR REPLACING OF ELECTRICAL CONNECTORS

BACKGROUND OF THE INVENTION

1. Field of Invention

The present invention relates to electrical connectors and, more particularly, to a tool for repairing or replacing electrical connectors.

2. Prior Art

Electronic systems are presently in use that have a housing for removably receiving multiple printed circuit boards. The housings are sometimes called card cages or printed circuit board receiving cages. Back panels of the cages have electrical connectors for making electrical connection to inserted printed circuit boards. The front of the cage is generally open (though a movable cover can be used) to allow for insertion and removal of printed circuit boards into the cage. Top and bottom interior surfaces of the card cage have guide channels for slidingly receiving the corresponding edges of a similarly orientated printed circuit board. The channels guide the boards towards their respective intended electrical connector(s) and physically support the printed circuit board in the cage. A problem has arisen in these types of cages in that, in the event that an electrical connector or contact(s) of a connector becomes damaged, it is difficult and often not possible to repair or replace the damaged member unless the back panel is first disassembled from the card edge.

SUMMARY OF THE INVENTION

In accordance with one embodiment of the present invention, a tool for on-site repairing and replacing of electrical connectors or electrical contacts is provided comprising a frame and a positioner. The frame has first guides on two opposite ends for sliding in opposing second guides of a printed circuit board receiving cage. The positioner is movably attached to the frame. The positioner has a first section, a second section, and a third section. The first section is for moving a working head connected to the first section in a first direction. The second section is for moving the first section in a second direction orthogonal to the first direction. The third section is for moving the first and the second sections in a third different direction.

In accordance with another embodiment of the present invention, a tool for on-site repair of electrical connectors is provided comprising a frame, means for attaching the frame to a cage, a positioner, and a working head. The means for attaching the frame to a cage is for stationarily and removably attaching the frame to a modular attachable component receiving cage. The positioner is attached to the frame. The positioner has a working head mounting area and means for moving the mounting area in at least three decoupled orthogonal directions. The working head is removably attached to the mounting area.

BRIEF DESCRIPTION OF THE DRAWINGS

The foregoing aspects and other features of the invention are explained in the following description, taken in connection with the accompanying drawings wherein.

DETAILED DESCRIPTION OF THE PREFERRED EMBODIMENT

Figure 1:
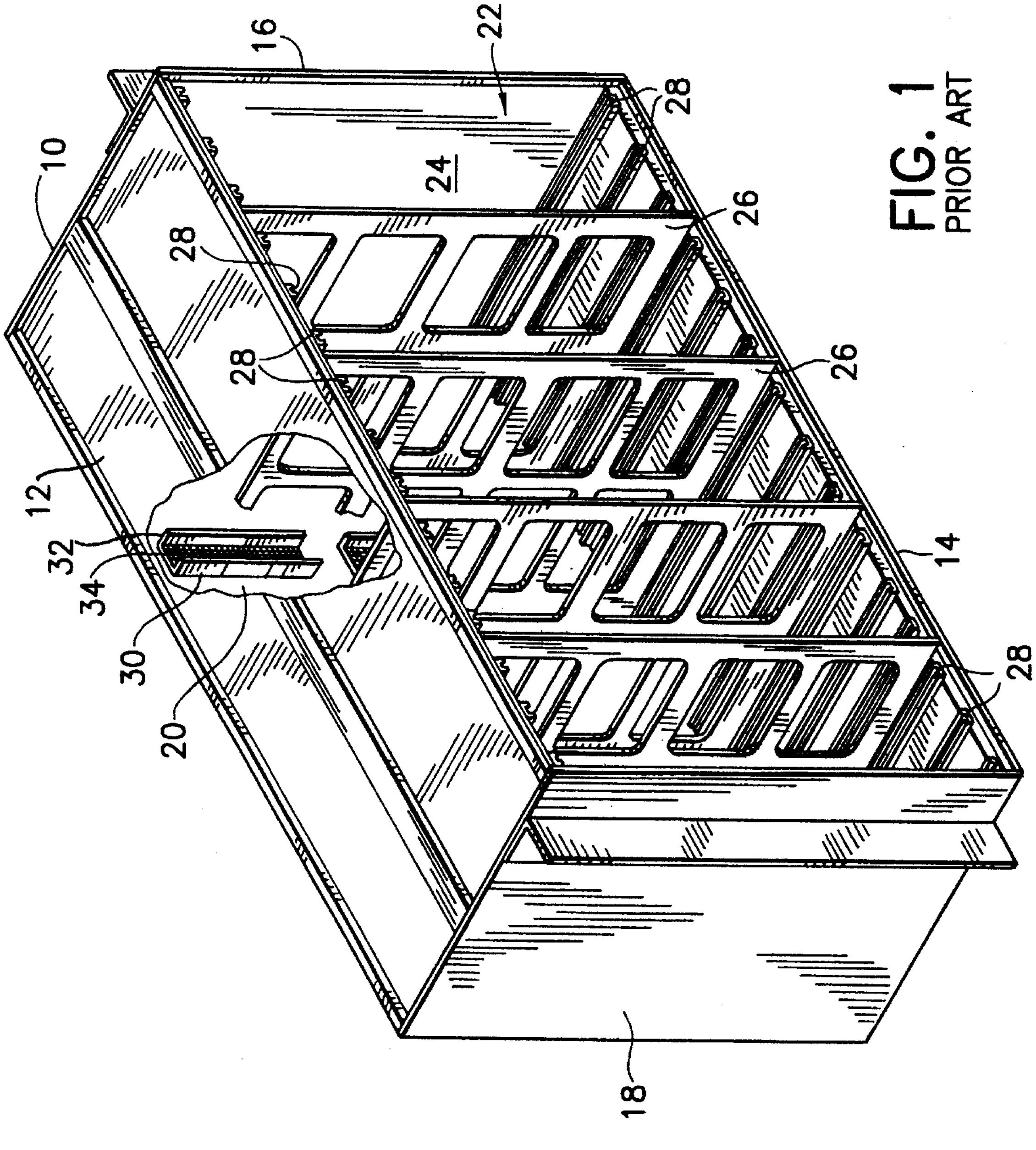
FIG. 1 PRIOR ART
FIG. 1 is a perspective view of a printed circuit board receiving cage with a cut away section known to exist in the prior art.

Referring to FIG. 1, a printed circuit board receiving cage or card edge 10 is shown with a partial cut away section. The cage 10 has a general box-like shape with a top wall 12, a bottom wall 14, two end walls 16, 18 and a back panel 20. The front 22 of the cage 10 is generally open. However, a movable cover could also be used. The cage 10 establishes a receiving area 24 for removably receiving a plurality of printed circuit boards (not shown). In an alternate embodiment, the cage could be configured to removably receive other types of electrical or electronic components. The cage 10 also includes reinforcing struts 26 extending between the top wall 12 and the bottom wall 14. Located on interior sides of the top wall 12 and bottom wall 14 are guides or guide channels 28. The guide channels 28 are suitably sized, shaped, and positioned relative to each other to slidably removably receive printed circuit boards between opposing channels. The back panel 20 has columns of electrical connectors 30 fixedly connected thereto. The connectors 30 each generally comprise a housing 32 and a plurality of electrical contacts 34. The cage 10 can be suitably configured and/or oriented to receive printed circuit boards in any suitable orientation including vertical or horizontal.

When a printed circuit board is fully slid into the cage 10 in one of the pairs of opposing channels 28, the board makes electrical connection with the connectors 30 for that associated pair of channels 28. The boards can be removed from and inserted into the cage 10 in a general modular fashion. The cage 10 could have any suitable type of electrical connectors for connection with the printed circuit board. In addition, other types of cage configuration could be provided.

Figure 2:
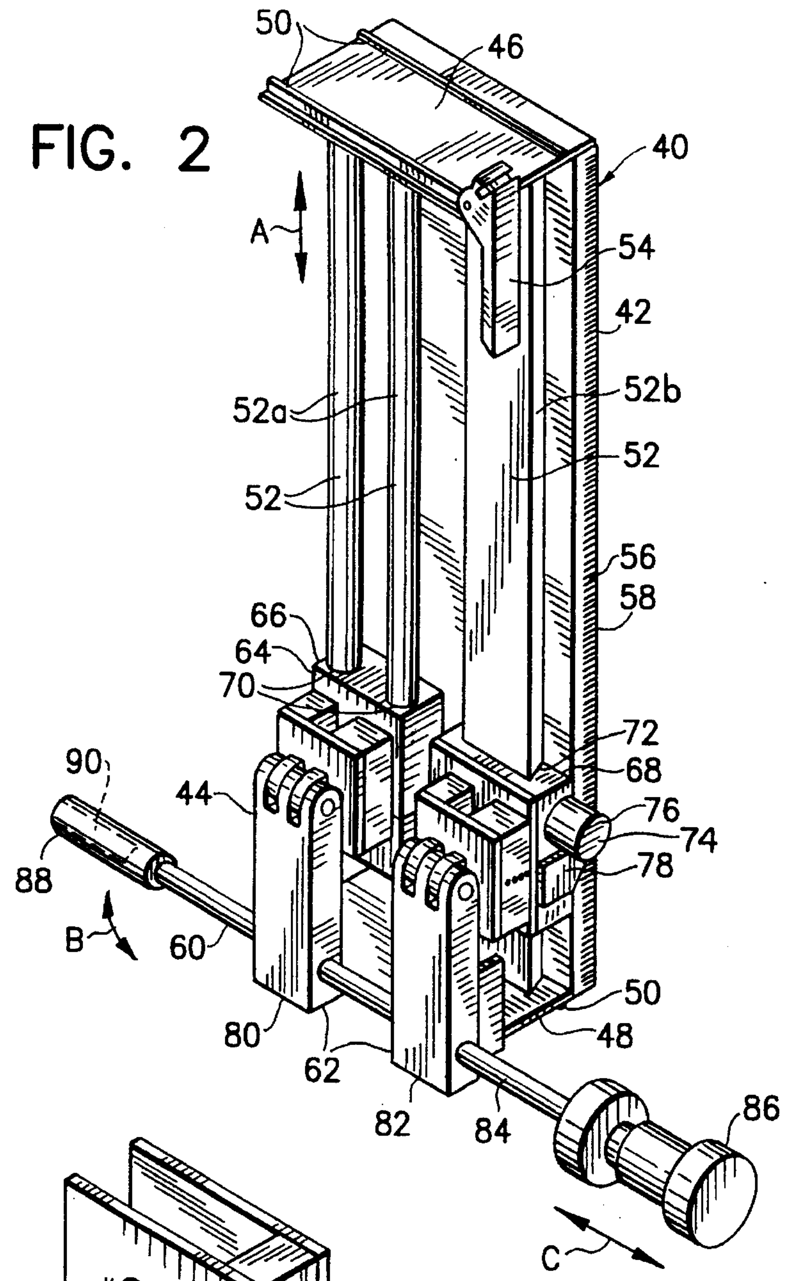
FIG. 2 is a perspective view of a tool incorporating features of the present invention for use with the cage shown in FIG. 1.

Referring now to FIG. 2, there is shown a perspective view of a tool 40 incorporating features of the present invention. The tool 40 generally comprises a frame 42 and a positioner 44. The frame 42 includes a top end 46 and a bottom end 48. A first set of guide rails 50 is located at each of the ends 46, 48. The guide rails 50 are located on exterior sides of the two ends 46, 48. The frame 42 also has a second set of guide rails 52. The second set of guide rails 52 extends between the top and bottom ends 46, 48. A locking latch 54 is provided at the top end 46. Indicia 56 is provided on a side middle section 58 between the two ends 46, 48. In alternate embodiments, any suitable number, size, shape and type of first and second sets of guide rails or other guides could be provided on the frame as long as they function properly with the guide channels 28 and positioner 44.

The positioner 44 generally comprises a first section 60, a second section 62, and a third section 64. The three sections 60, 62, 64 are generally connected to each other is series. The third section 64 is movably mounted on the frame 42. More specifically, the third section 64 is mounted on the second set of guide rails 52 for movement in vertical direction A. In the embodiment shown, the third section 64 has a first block 66 and a second block 68. The first block 66 has two channels 70 in which the two guide rails **52*a* are slidingly located. The second block 68 has a channel 72 in which the guide rail 52*b* is located. The second block 68 has a micrometer-like movement mechanism 74. The mechanism 74 has a control knob 76, a pointer 78, and means for moving the second block 68 along the rail 52*b* when the control knob 76** is rotated. Micrometer-like movement mechanisms are well known in the mechanical arts. However, other types of movement mechanisms could be provided.

The second section 62, in the embodiment shown, includes two arms 80, 82 pivotably mounted to the third section 66. The arms 80, 82 are adapted to rotated in direction B between the down position shown in FIG. 2 and the up position shown in FIG. 4. In alternate embodiments, other types of second sections could be provided and, could provide additional or alternative motion(s) other than in direction B. The first section 60 generally comprises a rod 84, a handle 86 at one end of the rod 84, and a working head connection end 88 at the other end of the rod. The rod 84 is slidably mounted in the arms 80, 82 of the second section 62 for movement as indicated by direction arrow C. The handle 86 is provided for a user to control the movement of the rod 84 in direction C. The working head connection end 88 is adapted to removably mount a working head to the rod 84. Any suitable type of means could be used to removably mount a working head to the connection end 88, such as a threaded screw-like connection. The connection end 88 has a connection area 90 therein for receiving a connection portion of the working head. In alternate embodiments, other types of first sections and connection ends could be provided.

Figure 3A:
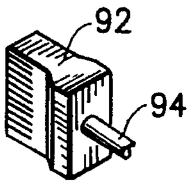
FIG. 3A is a perspective view of a working head for use with the tool shown in FIG. 2.
Figure 3B:
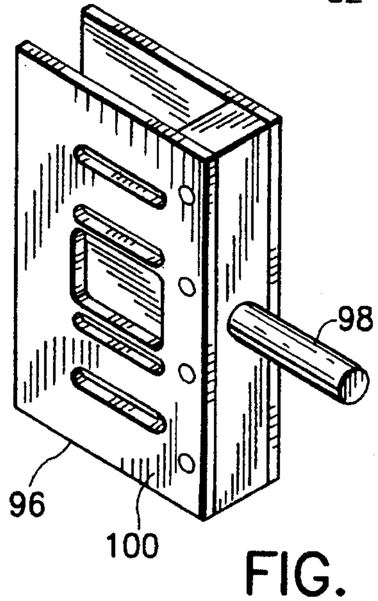
FIG. 3B is a perspective view of an alternative form of working head.
Figure 3C:
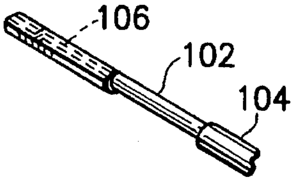
FIG. 3C is a perspective view of another alternative form of working head.
Figure 3D:
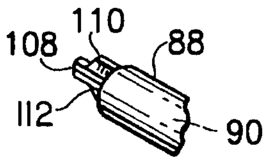
FIG. 3D is a perspective view of another alternative form of working head.

Referring also to FIGS. 3A–3D, there are shown four different types of working heads for use with the tool 40 shown in FIG. 2. FIG. 3A shows a perspective view of an electrical connector insertion head 92. The head 92 has a stem 94 for mounting in area 90 of the positioner 44. Referring also to FIG. 1, an electrical connector 30 can be mounted on the head 92 for fixedly positioning the electrical connector on the back panel 20 of the cage 10. The head 92 is suitably configured so as not to damage the contacts 34 of the connector 30 during insertion. The head 92 is preferably configured for the specific size, shape and configuration of the connector intended to be mounted to the back panel 20. FIG. 3B shows a perspective view of an electrical connector removal head 96. The removal head 96 has a stem 98 for connection in the connection area 90 and a body 100 that is adapted to surround and clamp onto a housing 32 of one of the electrical connectors 30, such as by a snap-lock latching. The removal head 96 is preferably suitably configured for the specific housing of the connector intended to be removed from the back panel 20. FIG. 3C shows a perspective view of an individual contact insertion head 102. The insertion head 102 has a stem 104 for mounting in the area 90 of the positioner 44. The insertion head 102 also has a pocket 106 for holding an individual contact 34 that is to be inserted into a connector 30 located on the back panel 20. FIG. 3D shows a perspective view of an individual contact removal head 108. The removal head 108 has two clamping arms 110, 112 that are positioned in the area 90 of the working head connection end 88. The arms 110, 112 can clamp onto an individual one of the contacts 34 of the connectors 30 on the back panel 20. When the removal head is withdrawn, the clamped contact can be removed from both the back panel and its associated connector housing. In alternate embodiments, other sizes, shapes and types of insertion and removal working heads could be provided. In addition, any suitable type of means to connect the working heads to the positioner could be used.

Figure 4:
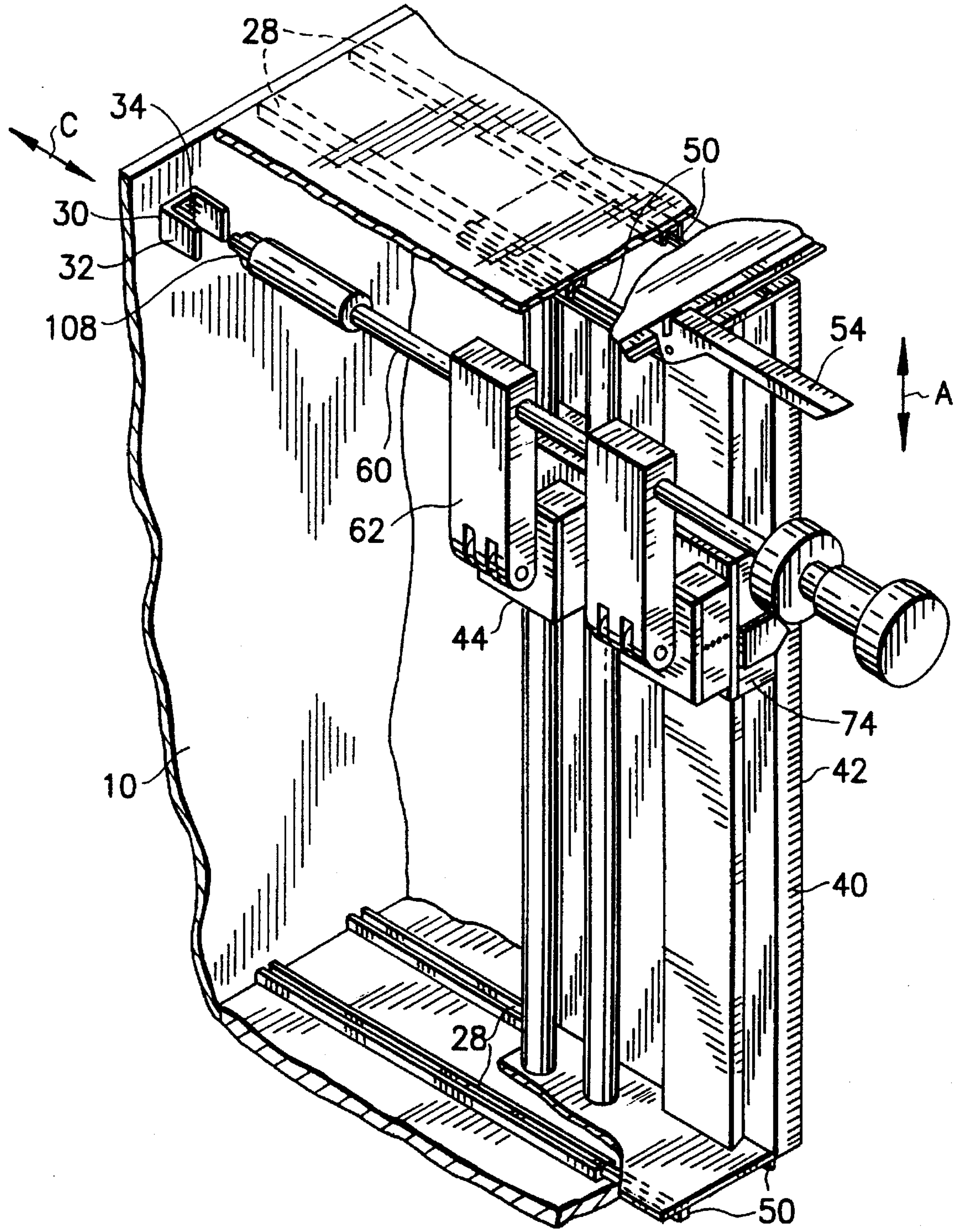
FIG. 4 is a perspective cut away view of the tool shown in FIG. 2 mounted to the cage shown in FIG. 1 with the working head shown in FIG. 3D connected to the tool.

Referring now also to FIG. 4, there is shown a perspective cut-away view of the tool 40 attached to the cage 10. The tool 40 has the removal head 108 connected to it. When the tool 40 is mounted to the cage 10, the guide rails 50 are slidingly located in opposing guide channels 28. The locking latch 54 stationarily, but removably latches the frame 42 onto the cage 10. Thus, the tool 40 is able to use the printed circuit boards guide channels 28 to help mount the tool 40 to the cage 10. In order to move the attached working head 108 to the desired location, the user uses the movement mechanism 74 to move the positioner 44 in vertical direction A and, pivots the second section 62 to its desired location. The user then moves the first section 60 in direction C to first clamp onto a single individual contact 34 and then pull the clamped contact out of its housing 32. The removal head 108 can then be replaced by the insertion head 102. The tool 40 and insertion head 102 can then be used to insert a new contact in the former location of the removed contact 34. A new contact 34 is located in the pocket 106. Then the positioner 44 is moved to the desired location and the user moves the handle 86 forward. This moves the connection end 88 forward to press-fit insert the new contact into the connector housing and the back panel. The user then moves the handle 86 reward to retract the connection end 88. The newly inserted contact stays connected to the housing and back panel. The working heads 92 and 96 can be used in a similar manner, but for whole connectors rather than single contacts. The present invention allows for relatively easy and precise on-site repair and/or replacement of damaged electrical connectors in a component receiving cage. The present invention also reduces repair time and repair costs.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A tool for on-site repairing and replacing of electrical connectors or electrical contacts comprising:

a frame having first guides on two opposite ends for sliding in opposing second guides of a printed circuit board receiving cage; and a positioner movably attached to the frame, the positioner having a first section for moving a working head connected to the first section in a first direction, a second section for moving the first section in a different second direction, and a third section for moving the first and second sections in a different third direction, wherein the first guides comprise a first set of rails located on exterior top and bottom sides of the frame.

2. A tool as in claim 1 wherein the frame has a second set of elongate rails extending between a top and a bottom of the frame, the third section being movably mounted to the second set of rails.

3. A tool as in claim 1 wherein the second section is rotatably connected to the third section.

4. A tool as in claim 1 wherein the first section has a rod that is longitudinally movably connected to the second section.

5. A tool as in claim 1 further comprising a locking latch for stationarily and removably mounting the frame to the receiving cage.

6. A tool as in claim 1 wherein the first section has a working head mounting section for removably mounting different types of working heads to the positioner.

7. A tool as in claim 1 wherein the positioner includes means for holding at least one of the sections at a stationary location relative to the frame unless moved by a user.

8. A tool for on-site repair of electrical connectors in a modular electrical component receiving cage, the tool comprising:

a frame;

means for stationarily and removably attaching the frame to the modular electrical component receiving cage wherein the means for attaching the frame to the cage includes guide rails on a top and a bottom of the frame for sliding in guide channels of the cage;

a positioner attached to the frame, the positioner having a working head mounting area and means for moving the mounting area in at least three directions; and a working head removably attached to the mounting area.

9. A tool as in claim 8 wherein the means for attaching the frame to the cage includes a locking latch mounted to the frame adapted to latch onto the cage and hold the frame at a stationary location in the cage.

10. A tool as in claim 8 wherein the frame has vertically oriented guide rails for the positioner to move up and down on the frame.

11. A tool as in claim 10 wherein the means for moving has at least three serially connected sections, a third one of the sections being movably mounted to the vertically oriented guide rails.

12. A tool as in claim 11 wherein a second one of the sections is rotatably connected to the third section.

13. A tool as in claim 11 wherein a first one of the sections includes a rod longitudinally movable relative to a second one of the sections, the first section having the working head mounting area.

* * * * *